United States Patent [19]

Kubota

[11] 4,029,982
[45] June 14, 1977

[54] PLUG FOR INTERNAL COMBUSTION ENGINE FOR LIMITING PRODUCTION OF NITROGEN OXIDE

[76] Inventor: Hidetsugu Kubota, No. 122, 3-chome, Motomachi, Kameda, Naka Kanbara-gun, Niigata-Ren, Japan

[22] Filed: Feb. 11, 1976

[21] Appl. No.: 657,299

[30] Foreign Application Priority Data

Feb. 17, 1975 Japan .............................. 50-19534

[52] U.S. Cl. ............................. 313/11.5; 313/120; 123/169 PA
[51] Int. Cl.² .......................................... F23Q 3/64
[58] Field of Search .................... 313/11.5, 120; 123/169 PA

[56] References Cited

UNITED STATES PATENTS 1,770,608   7/1930   Fischer .............................. 313/120

Primary Examiner—Rudolph V. Rolinec
Assistant Examiner—Darwin R. Hostetter
Attorney, Agent, or Firm—Henry R. Lerner

[57] ABSTRACT

A plug for use in a cylinder of an internal combustion engine adapted to limit the production of nitrogen oxide (NOx). The plug has an inner cover which surrounds the ignition electrodes with the inner cover having an opening to provide communication between the electrodes and the engine cylinder. An outer cover surrounds the inner cover in spaced relation therewith and has an opening in juxtaposition with the inner cover opening. The outer cover has a number of perforations so that water injected between the inner and outer covers through one or more nozzles is evaporated into steam upon engagement with the red-hot outer cover with the steam passing through the perforations into the cylinder in a direction away from the electrodes so as not to interfere with the functioning of the electrodes.

4 Claims, 3 Drawing Figures

PLUG FOR INTERNAL COMBUSTION ENGINE FOR LIMITING PRODUCTION OF NITROGEN OXIDE

This invention relates to a plug for an internal combustion engine adapted to limit the production of a nitrogen oxide NOx.

It has always been a difficult problem to limit or separate nitrogen oxide (NOx) from the exhaust gas of an internal combustion engine such as an automobile engine. Under normal running conditions of an automobile engine, the cylinder temperature rises to approximately 2000° C. This rising temperature causes the production of NOx, which increases suddenly however, as the temperature of the cylinder goes beyond 1700° C. It has therefore been found that if a small quantity of steam is introduced into and mixed with the suction gas in the cylinder as the exhaust stroke changes to a suction stroke, the temperature rise in the cylinder can be limited to between 1600° and 1700° C., significantly limiting the chemical reaction between the oxygen and nitrogen and thereby decreasing the amount of production of NOx.

An object of the present invention is to provide an apparatus for feeding a sufficient quantity of water to evaporate instantaneously according to the temperature and the pressure in the cylinder.

In a manufactured engine, it is almost impossible to inject the steam into the compressed portion of the cylinder when the piston has almost reached the dead center point, in order to limit the production of the nitrogen oxide NOx. According to the present invention, an inner cylindrical cover with an opening and an outer cylindrical cover with a similar opening are arranged to surround a substantial portion of the electric ignition part at the end of a plug body, said outer cylindrical cover having numerous perforations all over its surface, and said plug body having one or more small section conduits for water bored therethrough terminating and in the form of nozzles at the end therefor between said inner and outer covers.

In accordance with the present invention, the water is injected from said nozzles in between the inner and outer covers and sprayed. Said sprayed water passes through said numerous perforations of the outer cover and then comes into collision with its red-hot wall and becomes evaporated. Accordingly to the apparatus of the present invention the evaporated water is separated from the ignition part thus not becoming an obstacle to the functioning of the ignition part at the head of the plug.

As above described, the present invention relates to applying the reasonable evaporation apparatus to the ignition part of the plug head and to make them in a body. In order to prevent the live steam from directly contacting the ignition part on the projecting end of the plug and flows, the ignition part is surrounded with a cylindrical inner core, a part of which opens in a direction opposite to that of the steam producing portion of said cover, and a steam generating cylindrical outer cover is arranged outside of said steam intercepting cylindrical inner cover. Furthermore, a plurality of nozzles lead into the small space between said inner and outer covers, and the water injected from said nozzles onto the red-hot cylindrical outer cover having numerous perforations is instantaneously evaporated but do not adversely affect the ignition part.

Thus the present invention has the distinctive feature that the ignition part and evaporating part are made in a body, and perfectly separated in performance, and can achieve their object.

The plug according to the present invention can be used in cooperation with a water pressure adjusting tank in which distilled fresh water and air are mixed and kept always at a constant pressure by means of a pump, and a water volume adjusting means adapted to adjust the volume of water being injected from the nozzles.

The plug according to the invention can be applied to not only a new manufactured car but a car in use.

These and other features of the invention will be apparent from the description on the embodiments shown by way of example with reference to the accompanying drawings.

Figure 1:
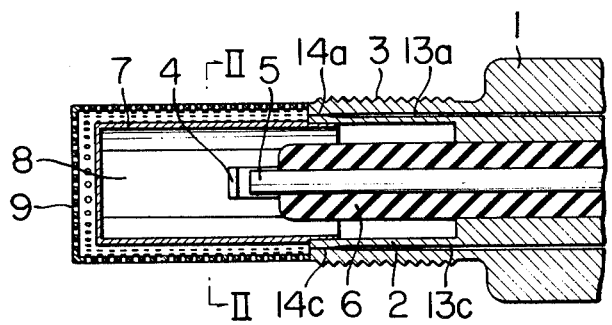
FIG. 1 is a sectional view of the first embodiment of the plug according to the present invention, which is taken along the line I—I of FIG. 2.
Figure 2:
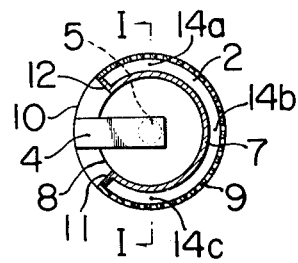
FIG. 2 is a sectional view of the same plug, which is taken along the line II—II of FIG. 1.

Referring now to FIGS. 1 and 2, a plug body 1 has as ordinary a cylindrical portion 2 which has a thread 3 adapted to fit it into a cylindrical head on outside of it and a ground electrode 4 projecting from the end of it, and which has a center electrode 5 covered with an insulating material 6. In this embodiment of the present invention a cylindrical inner cover 7 is fitted with said cylindrical portion 2 at its internal end, said cover 7 having an opening 8 along its wall longitudinally. Hence, said ground electrode 4 can project from the end of said cylindrical portion 2 and curve into the inside of said cover 7 so as to coincide the end of said center electrode 5 with the end of said ground electrode 4. Furthermore, there is provided a net-like outer cover 9 spaced a small distance from said cylindrical inner cover 7. Said net-like cover 9 has the same shape as that of said cylindrical inner cover 7 but is slightly greater in size. Outer cover 9 has an opening 10 in juxtaposition with said opening 8, and at the edges of both opening 8 and 10 elongated parts 11, 12 of said inner cover 7 are bent towards the net-like outer cover 9 and their ends are affixed to said cover 9. Three small conduits 13a, 13b and 13c (13b is not shown in the drawings) are provided through said plug body 1 and said cylindrical portion 2, each conduits 13a, 13b, and 13c terminating at the end of said cylindrical portion 2 between both covers 7 and 9, at where they form the nozzles 14a, 14b and 14c having a very small diameter. As shown in FIG. 2, their nozzles are preferably arranged at angular intervals of 90°.

Figure 3:
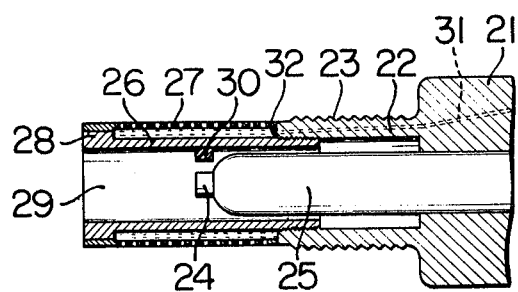
FIG. 3 is a sectional view similar to FIG. 1, of the second embodiment of the plug according to the present invention.

In FIG. 3, the other preferred embodiment of the present invention is shown. This embodiment is different from the above-mentioned first embodiment only in that the opening is provided at the end of the covers in comparison with the fact that the opening of the first embodiment is arranged longitudinally on the cylindrical wall and accordingly the ground electrode is arranged on the inside of the inner cover as against the center electrode on the side, and in all other respects, both embodiments are similar. Giving concrete expression to said second embodiment, a plug body 21 has a cylindrical part 22 with an outside thread 23 adapted to fit it into a cylinder head, and it has a center electrode 24 with an insulating material 25 surrounding said electrode 24, said electrode and said insulating material being arranged at the center of said cylindrical part 22 and projecting slightly from it. At the end and at the inside of said cylindrical part 22, an inner cover 26, which is of form of cylinder and has a annular projection 28 on one end, a thread on other end, is screwed into the end of said cylindrical part 22. An outer cover 27 having numerous perforations on its surface is placed on said inner cover 26 one over the other, and one end of it is fixed on said projection 28 for instance by welding, and the other end of it is placed opposite the end of said cylindrical part 22. The inner and outer covers 26 and 27 are spaced with a small distance. The end of said cover 26 is provided with an opening 29. There is provided a ground electrode 30 on the inside of the wall of said inner cover 26 so as to be opposite the center electrode 24 with an appropriate gap therebetween. As in the first embodiment, a small section conduit 31 for the water is bored through a plug 21 and the cylindrical part 22, and it terminates at the end of said cylindrical part 22 and between said covers 26 and 27. A nozzle 32 is formed on the end of said conduit. The conduits and nozzles are preferably 3 in number, and in this case, they are preferably arranged at angular interval of 120°.

In both embodiments, the water is injected from the nozzles into the clearance between the inner and outer covers and contacts with the red-hot perforations of the outer cover, causing the water to evaporate and lowering the temperature in the engine cylinder appropriately so that the production of the nitrogen oxide NOx is kept within bounds.

What I claim is:
1. A plug for use in an engine cylinder comprising,
   a. ignition electrodes,
   b. an inner cover surrounding said electrodes, said inner cover having an opening to provide communication between said electrodes and said engine cylinder,
   c. an outer cover surroundingly spaced from said inner cover and having an opening in juxtaposition with said inner cover opening,
   d. said outer cover having perforations whereby water injected between said inner and outer covers is evaporated into steam upon engagement with said outer cover, said steam passing through said perforations into said cylinder in a direction away from said electrodes.

2. A plug in accordance with claim 1, wherein there is further provided nozzle means for injecting water between said inner and outer covers.

3. A plug according to claim 2 characterized in that said openings are arranged longitudinally along the wall of said inner and outer covers.

4. A plug according to claim 2 characterized in that said openings are formed at the end of said inner and outer covers.

* * * * *